(12) United States Patent
Cronmiller et al.

(10) Patent No.: US 12,529,463 B2
(45) Date of Patent: Jan. 20, 2026

(54) WARNING LIGHTS USING DOMINANTLY VISIBLE VIOLET LIGHT TO INDUCE FLUORESCENCE IN PHOTOLUMINESCENT MATERIALS

(71) Applicant: STAR SAFETY TECHNOLOGIES, LLC, Avon, NY (US)

(72) Inventors: James J. Cronmiller, Penfield, NY (US); Stephen T. Vukosic, Avon, NY (US)

(73) Assignee: STAR SAFETY TECHNOLOGIES, LLC, Avon, NY (US)

( * ) Notice: Subject to any disclaimer, the term of this patent is extended or adjusted under 35 U.S.C. 154(b) by 0 days.

(21) Appl. No.: 18/648,429

(22) Filed: Apr. 28, 2024

(65) Prior Publication Data

US 2024/0360978 A1     Oct. 31, 2024

Related U.S. Application Data

(60) Provisional application No. 63/462,952, filed on Apr. 28, 2023.

(51) Int. Cl.
*F21S 43/00* (2018.01)
*B60Q 1/46* (2006.01)
(Continued)

(52) U.S. Cl.
CPC ............. *F21S 43/601* (2024.05); *B60Q 1/46* (2013.01); *F21S 4/28* (2016.01); *F21S 43/16* (2018.01);
(Continued)

(58) Field of Classification Search
CPC ............ F21S 43/16; F21S 43/255; F21V 9/06
See application file for complete search history.

(56) References Cited

U.S. PATENT DOCUMENTS

| 4,215,390 A | 7/1980 | Brandt |
| 5,253,150 A | 10/1993 | Vanni |

(Continued)

FOREIGN PATENT DOCUMENTS

| CN | 201526907 U | 7/2010 |
| CN | 204477750 U | 7/2015 |

(Continued)

OTHER PUBLICATIONS

International Patent Application No. PCT/US2024/026721, International Search Report and Written Opinion, Sep. 3, 2024.
(Continued)

*Primary Examiner* — William N Harris
(74) *Attorney, Agent, or Firm* — Kenneth J. LuKacher Law Group; Kenneth J. LuKacher

(57) ABSTRACT

A warning light having light sources for emitting light of different colors via at least a lens, where one of the colors is violet and other of the colors is non-violet along a spectrum of visible illumination. A controller selectably activates the light source(s) emitting non-violet light to provide visible warning signals, and the light source(s) emitting violet light to provide fluorescent inducing signals dominantly along the spectrum of visible illumination which causes any object or surface having phosphors to fluoresce in order to enhance their visibility in low or zero ambient light environments. The lens and/or optional filter, or coating along the lens, filters or blocks ultraviolet light to shift the peak wavelength of violet light source(s) so that fluorescent inducing signals are dominantly or more dominantly of higher wavelengths along the spectrum of visible violet illumination to human eyes. Single and dual warning light housings embodiments are provided.

21 Claims, 16 Drawing Sheets

(51) Int. Cl.

| | | |
|---|---|---|
| *F21S 4/28* | (2016.01) | |
| *F21S 43/14* | (2018.01) | |
| *F21S 43/15* | (2018.01) | |
| *F21S 43/16* | (2018.01) | |
| *F21S 43/20* | (2018.01) | |
| *F21V 9/06* | (2018.01) | |
| *F21V 23/00* | (2015.01) | |
| *F21W 103/30* | (2018.01) | |
| *F21Y 103/10* | (2016.01) | |
| *F21Y 113/00* | (2016.01) | |
| *F21Y 113/13* | (2016.01) | |
| *F21Y 113/17* | (2016.01) | |
| *F21Y 115/10* | (2016.01) | |
| *H05B 45/20* | (2020.01) | |
| *H05B 47/155* | (2020.01) | |
| *H05B 47/165* | (2020.01) | |

(52) U.S. Cl.
CPC ........... *F21S 43/255* (2018.01); *F21S 43/281* (2024.05); *F21V 9/06* (2013.01); *F21V 23/005* (2013.01); *H05B 45/20* (2020.01); *H05B 47/155* (2020.01); *H05B 47/165* (2020.01); *B60Q 2800/20* (2022.05); *F21S 43/14* (2018.01); *F21S 43/15* (2018.01); *F21S 43/265* (2024.05); *F21W 2103/30* (2018.01); *F21Y 2103/10* (2016.08); *F21Y 2113/13* (2016.08); *F21Y 2113/17* (2016.08); *F21Y 2113/30* (2023.05); *F21Y 2115/10* (2016.08)

(56) References Cited

U.S. PATENT DOCUMENTS

| | | | | |
|---|---|---|---|---|
| 5,255,163 | A * | 10/1993 | Neumann | F21S 41/17 362/465 |
| 7,726,856 | B2 | 6/2010 | Tsutsumi | |
| 7,791,497 | B2 | 9/2010 | Clerk | |
| 9,098,998 | B2 | 8/2015 | Quell et al. | |
| 9,902,315 | B2 | 2/2018 | Salter et al. | |
| 10,076,993 | B2 | 9/2018 | Nichols | |
| 10,788,186 | B2 | 9/2020 | Estes et al. | |
| 11,050,488 | B1 | 6/2021 | Cronmiller | |
| 11,117,678 | B2 | 9/2021 | Nichols | |
| 11,326,756 | B1 | 5/2022 | Datz et al. | |
| 11,457,517 | B2 | 9/2022 | Nichols et al. | |
| 11,466,833 | B2 | 10/2022 | Nichols et al. | |
| 2007/0148601 | A1 * | 6/2007 | Sharma | C03C 8/00 430/313 |
| 2008/0013335 | A1 * | 1/2008 | Tsutsumi | F21V 9/06 362/545 |
| 2008/0218998 | A1 | 9/2008 | Quest et al. | |
| 2009/0010013 | A1 | 1/2009 | Hessling | |
| 2010/0060439 | A1 | 3/2010 | Fitzgerald | |
| 2012/0273663 | A1 | 11/2012 | Young | |
| 2020/0376856 | A1 | 12/2020 | Saitoh | |
| 2021/0120641 | A1 | 4/2021 | Nichols et al. | |
| 2021/0172591 | A1 | 6/2021 | Nichols et al. | |
| 2021/0205487 | A1 * | 7/2021 | Balme | F21V 9/35 |
| 2022/0377865 | A1 | 11/2022 | Nichols et al. | |
| 2023/0194066 | A1 | 6/2023 | Nichols et al. | |
| 2023/0290910 | A1 | 9/2023 | Lu et al. | |

FOREIGN PATENT DOCUMENTS

| | | | | |
|---|---|---|---|---|
| CN | 108458290 | A | 8/2018 | |
| CN | 110006007 | A | 7/2019 | |
| CN | 114543004 | A | 5/2022 | |
| GB | 2311593 | A * | 10/1997 | F21S 41/20 |
| GB | 2599636 | A | 4/2022 | |
| KR | 1020110047433 | | 5/2011 | |

OTHER PUBLICATIONS

Acari Fleet Solutions UV, Acari-UV Warning Light, Avid Labs, LLC, 2022.

Star Headlight & Lantern Co., Versa Star® LED Lights, Feb. 19, 2016.

* cited by examiner

WARNING LIGHTS USING DOMINANTLY VISIBLE VIOLET LIGHT TO INDUCE FLUORESCENCE IN PHOTOLUMINESCENT MATERIALS

This application claims priority to U.S. Provisional Patent Application No. 63/462,952, filed Apr. 28, 2023, which is incorporated herein by reference.

FIELD OF THE INVENTION

The present invention relates to warning lights emitting light of different colors, in which one of the different colors is violet that is dominantly along the spectrum of visible illumination to human eyes in order to induce fluorescence in photoluminescent materials, and one or more other different colors are non-violet in the visible light spectrum to human eyes. The warning lights of the present invention are useful in that non-violet visible warning signals, such as amber, red, blue, and/or white light, and fluorescence inducing signals of dominantly visible violet light can be selectably outputted, in which the fluorescence inducing signals when outputted causes objects or surfaces having photoluminescent materials, such as phosphors, to fluoresce in order to enhance their visibility in low or zero ambient (natural and/or artificial) light environments.

BACKGROUND OF THE INVENTION

Warning lights are commonly present on work vehicles at roadway construction sites to output visible warning signals of colors, such as white, red, blue, or amber, or combinations thereof. Workers at these sites typically wear reflective safety vests so that drivers in passing vehicles can notice them to avoid injury and accidents. In low or zero ambient light environments, these vests are typically illuminated by the headlights of oncoming vehicular traffic, white work lights, and work vehicle warning lights. Illuminating the vests strongly lights up the surrounding area as well as the vest reflective material, such as stripes, which makes the contrast in illumination between the background scene and the vest as not significant. An optical effect known as fluorescence occurs when light in a specific wavelength directed to photoluminescent materials causes those materials to fluoresce and reflect back light which has been shifted towards the visible spectrum. This is used in forensics as well as entertainment, and has recently been applied in warning lights using ultraviolet (UV) in U.S. Pat. No. 11,457,517 and U.S. Published Patent Application No. 2023/0194066.

U.S. Pat. No. 11,457,517 describes a lighting system with non-visible UV and visible light sources, where UV is defined as electromagnetic radiation with a wavelength from roughly 10 nm to 380 nm range. This lighting system strobes on non-visible UV light in a wavelength range of 360 nm to 385 nm, referred to as invisible UV by being outside of the visible range of what the human eye can see without the aid of a device, using at least one UV light source, and such UV light source is strobed off when the visible light source(s) are on. This lights up items like safety vests during the off mode of visible light when those items will be illuminated by the invisible UV light. While useful to improve safety of workers by the invisible UV light fluorescing their safety vests in work zone areas, invisible UV light can be harmful to human eyes (by damaging retina and/or cataracts) and also skin, where exposure time before damage occurs, i.e., threshold limit values, decreases as UV wavelengths shorten, as set by The American Conference of Governmental Industrial Hygienists (ACGIH) in the 2001 publication titled "Threshold limit values for chemical substances and physical agents and biological exposure indices".

U.S. Published Patent Application No. 2023/0194066, a continuation-in-part application which claims priority to at least U.S. Pat. No. 11,457,517, includes embodiments for the UV light sources to utilize light further extending into the range of wavelengths of 315 nm to 400 nm, or 385 nm to 445 nm, for the lighting systems of U.S. Pat. No. 11,457,517. As explained in U.S. Published Patent Application No. 2023/0194066, light sources in these extended ranges will include substantial UV light at the lower end of their Gaussian spectral distributions (e.g., approximately 30% of total light output can be at UV wavelengths less than 365 nm for LEDs designed to emit light between 385 nm and 400 nm), apparently this is needed to provide sufficient invisible UV light output, at or below 385 nm, for proper operation of its lighting systems as described above in U.S. Pat. No. 11,457,517.

FIG. 1 shows the UV hazard function, a measure of intensity of UV in terms of sunburning UV ($S_{UV(\lambda)}$ the actinic ultraviolet hazard weighting function), versus wavelength, per the International Electrotechnical Commission (IEC) Standard 62471 titled "Photobiological safety of lamps and lamp systems", to illustrate damage of UV light on humans in the range of about 355 nm to 400 nm. Invisible UV light, even when strobed, can cause health risks over time, unless UV safety goggles and/or UV skin protection are used. Thus, it would be desirable to have a warning light which may be used at roadway construction sites which does not operatively rely on the use of invisible UV light, includes material(s) reducing risk of harmful UV radiation, and can still provide desired optical fluorescence effect of photoluminescent materials, such as reflective safety vests, in order to improve their visibility in low or zero ambient light.

SUMMARY OF THE INVENTION

Accordingly, it is an object of the present invention to provide warning lights providing fluorescence inducing signals dominantly along the spectrum of visible illumination to human eyes which do not operationally rely on invisible UV light to cause fluorescence in photoluminescent materials and includes material(s) reducing risk of harmful UV radiation.

A further object of the present invention is to provide warning lights which can output non-violet visible warning signals in colors, such as amber, red, blue, and/or white, and fluorescence inducing signals of dominantly visible violet light.

It is another object of the present invention to provide warning lights having at least one light source emitting violet light and a lens (and/or coating along the lens or filter) of material(s) for filtering or blocking UV light, which shifts the peak wavelength and wavelength range of the emitted violet light to dominantly, or more dominantly, higher wavelengths of visible violet light when outputted to induce fluorescence in photoluminescent materials, thereby reducing risk of harmful UV radiation being emitted.

Briefly described, the warning light embodying the present invention has a plurality of light sources, such as LEDs, for emitting light of different colors, wherein one of the different colors emitted is violet with a first peak wavelength along a first range of wavelengths, and one or more other of the different colors is non-violet along the spectrum of visible illumination (e.g., amber, red, blue, and/or white), and at least a lens through which light from each of the light sources when activated is projected. A controller is provided for activating at least one of the light sources emitting non-violet light to provide visible warning signals via at least the lens, and for activating at least one of light sources emitting violet light to provide, via at least the lens, fluorescence inducing signals for photoluminescent materials. The fluorescence inducing signals have a second peak wavelength along a second range of wavelengths, where in response to passing through at least the lens, the second range of wavelengths is one of dominantly or more dominantly of higher wavelengths along the spectrum of visible violet illumination to human eyes than the first range of wavelengths, and the second peak wavelength is higher than the first peak wavelength.

The fluorescence inducing signals cause objects or surfaces, such as safety vests, having photoluminescent materials, such as phosphors, to fluoresce in order to enhance visibility of those objects or surfaces, especially in low or zero ambient light environments. Examples of low or zero ambient light environments, include, but not limited to roadway work sites when natural light, such as sunlight, is low or non-existent. Unlike visible warning signal which illuminate an entire scene but do not induce fluorescence in photoluminescent materials, the warning light when outputting fluorescence inducing signals in low or zero ambient light creates contrast on a work site by causing reflected visible light on the vest of a worker to fluoresce improving their visibility, while not illuminating the rest of the scene at the site as much.

The shift in first to second peak wavelengths and wavelength ranges of the violet light reduces the risk of harmful UV radiation which may be outputted from warning light when light sources emitting violet light are activated, and is preferably due to the lens filtering or blocking light energy along a lower portion of the first range of wavelengths representing UV radiation. The fluorescence inducing signals preferably has the second peak wavelength at or between 400 nm to 420 nm, within the second range of wavelength of 386 nm to 435 nm for at least 95% of light energy of the fluorescence inducing signals. Preferably, at least 90% of the light energy of fluorescence inducing signals is above 392 nm, well within the range of visible light to humans which roughly lies from wavelengths 390 nm (violet) to 700 nm (red), where most humans can see violet light down to 400 nm, and some can still see violet light with unaided eye to 390 nm. The emitted light from the violet light source(s) preferably has the first peak wavelength below 400 nm, such as for example at 395 nm with the first range of wavelengths at or about 370 nm to 435 nm about such first peak wavelength. However, other violet light sources may be used in the warning light so long its range of violet wavelengths emitted extends from the UV range to just above the UV range into the visible spectrum of light.

The non-violet light source(s) may have a peak wavelength and range having little or no shift in response to passing through the lens of the warning light. Thus, the lens shifts a dominant or peak wavelength of the light from the violet light source(s), and is predominantly non-shifting in wavelength to light from the non-violet light source(s).

The lens of the warning light is composed of UV absorbing material which filter or block UV light, such as polycarbonate. Polycarbonate is highly opaque in the UV light spectrum especially at wavelengths at and below 385 nm. Alternatively, or in addition to the lens being composed of UV absorbing material, a UV absorbing coating (in one or more layers) along the lens, and/or a UV light filter, may be provided in order to achieve the desired peak wavelength and range of wavelengths of the fluorescence inducing signals when violet light source(s) are activated.

The warning light of the present invention has a housing for disposing the lens to receive light from the light sources, and one or more circuit boards upon which the controller and the light sources are mounted. The housing may be mountable to a vehicle.

The controller activates the light sources in one of a plurality of patterns to provide warning signals and/or fluorescence inducing signals. In a first mode, the controller operates the light sources to provide an alternating two state operation, where in a first state light source(s) enabling visual warning signals are ON and light source(s) enabling fluorescence inducing signals are OFF, and in a second state light source(s) enabling fluorescence inducing signals are ON and light source(s) enabling visual warning signals are OFF. Each state may occur for a desired interval, such as 0.5 seconds, but other duration may be used. In a second mode, the controller operates the light sources to periodically repeat a three state operation, where in a first state light source(s) enabling visual warning signals are ON and light source(s) enabling fluorescence inducing signals are OFF, in a second state the light sources enabling both visual warning signals and fluorescence inducing signals are ON, and in a third state the light source(s) enabling fluorescence inducing signals are ON and the light source(s) enabling visual warning signals are OFF. The three states may repeat in numerical ascending and then descending order sequence, i.e., first state, second state, third state, second state, first state, and so on, where preferably the second state duration is shorter than that the duration of each of the first and third states, but other sequencing and duration of the three states may be used.

The present invention further embodies a warning device having two separate housings each having light sources emitting a different one of the above-described colors of violet and non-violet. Thus, a first of the housings has light source(s) operates to provide the above-described visual warning signals, and a second housing has light source(s) operates to provide the above-described fluorescence inducing signals. Each of the first and second housings have controllers which may be coordinated or synched with each other to provide the desired two or three state operation of visual warning signals and fluorescence inducing signals described above, albeit each from a different one of the two housings, which are in proximity to each other.

The present invention further provide a method for outputting different colors of light from a warning device comprising steps of: providing a plurality of light sources for emitting light of different colors, wherein one of the different colors of light emitted is violet having a first peak wavelength along a first range of wavelengths, and one or more other of the different colors is non-violet along a spectrum of visible illumination to human eyes; activating at least one of the non-violet light sources to provide visible warning signals via at least a lens; and activating at least one of the violet light sources, via at least the lens, to provide fluorescence inducing signals for photoluminescent materials having a second peak wavelength along a second range of wavelengths, wherein in response to passing through at least the lens the second range of wavelengths is one of dominantly or more dominantly of higher wavelengths along the spectrum of visible violet illumination to human eyes than the first range of wavelengths, and the second peak wavelength is higher than the first peak wavelength.

The method may further include the step of providing the lens composed of ultraviolet radiation absorbing material, with or without an ultraviolet light filter and/or an ultraviolet light absorbing coating (of one or more layers) along the lens. The ultraviolet radiation absorbing material(s) of the lens, and the filter and/or coating if present, operate to provide the fluorescence inducing signals having the second peak wavelength and the second range of wavelengths in response light from the violet light source(s) when passing there through.

BRIEF DESCRIPTION OF THE DRAWINGS

The foregoing and other objects, features, and advantages of the invention will become more apparent from a reading of the following description in connection with the accompanying drawings in which:

FIG. 13A shows a first housing having violet light sources which provides fluorescence inducing signals when activated, and FIG. 13B shows a second housing having non-violet light sources which provides visible warning signals when activated.

DETAILED DESCRIPTION OF THE INVENTION

Figure 1:
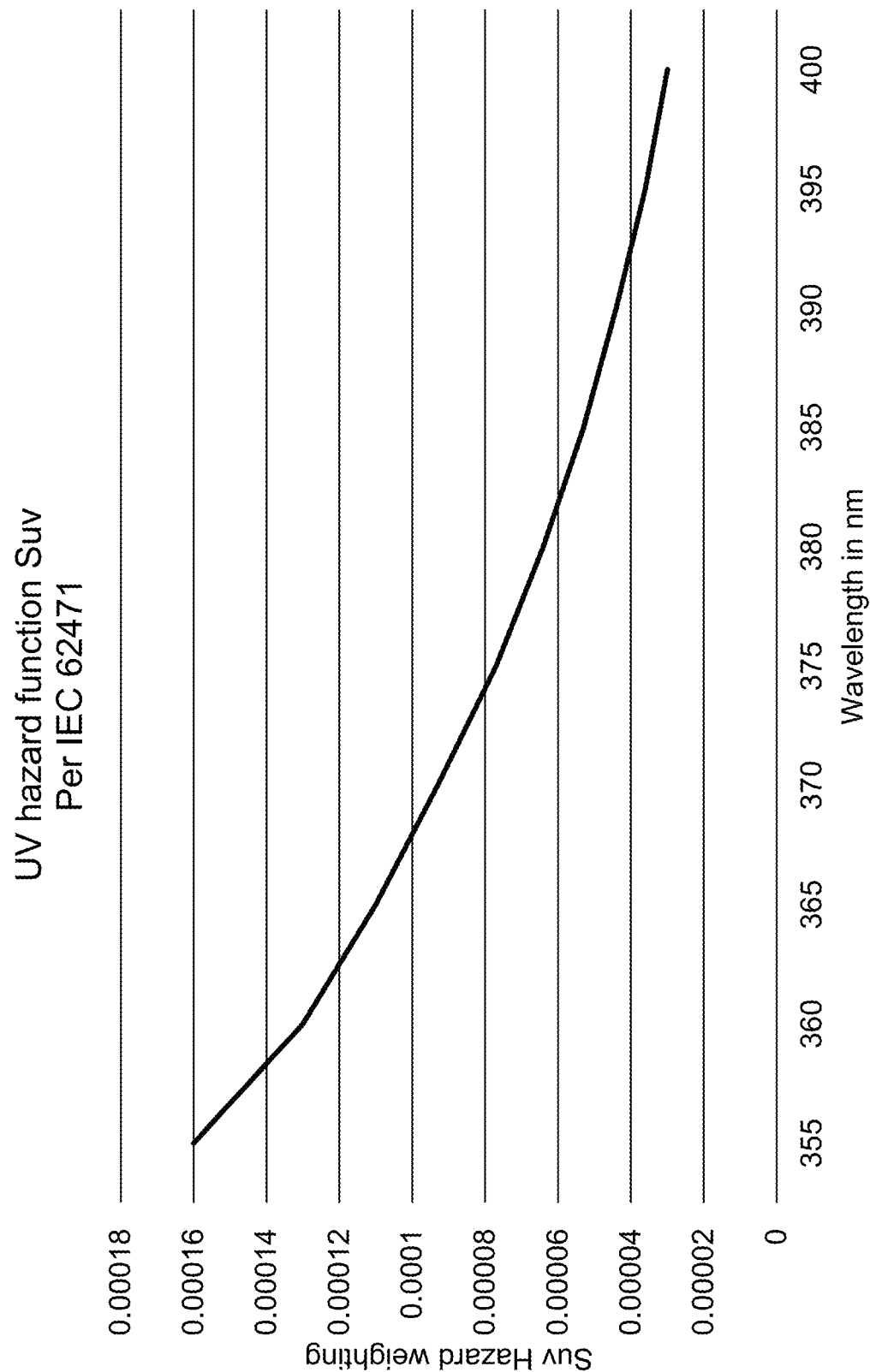
FIG. 1 is a graph illustrating sunburning UV hazard function ($S_{UV(\lambda)}$ the actinic ultraviolet hazard weighting function), a measure of intensity of UV versus wavelength, set forth by the International Electrotechnical Commission (IEC) Standard 62471.
Figure 2:
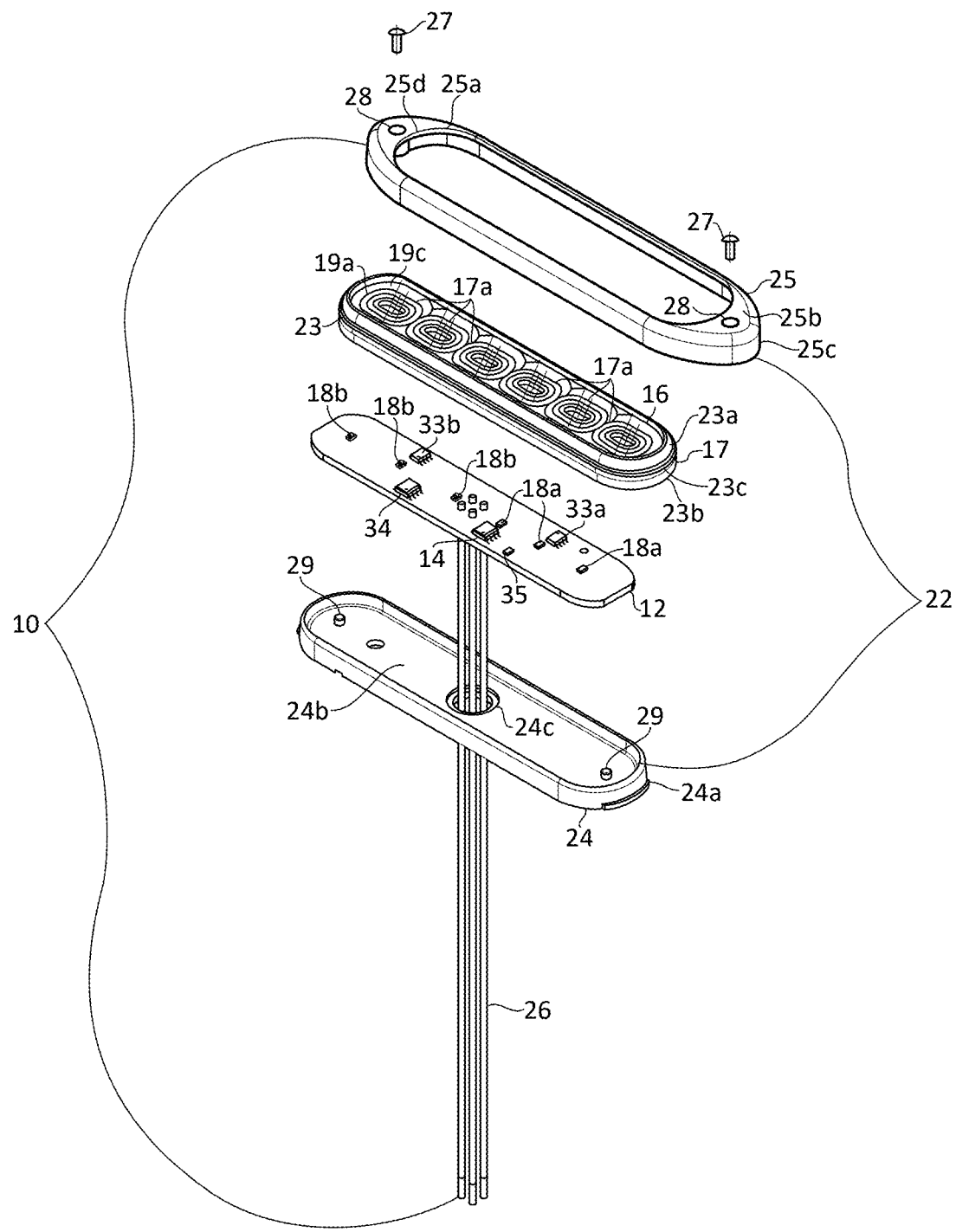
FIGS. 2 and 3 are exploded and assembled perspective views, respectively, of the warning light of the present invention.
Figure 3:
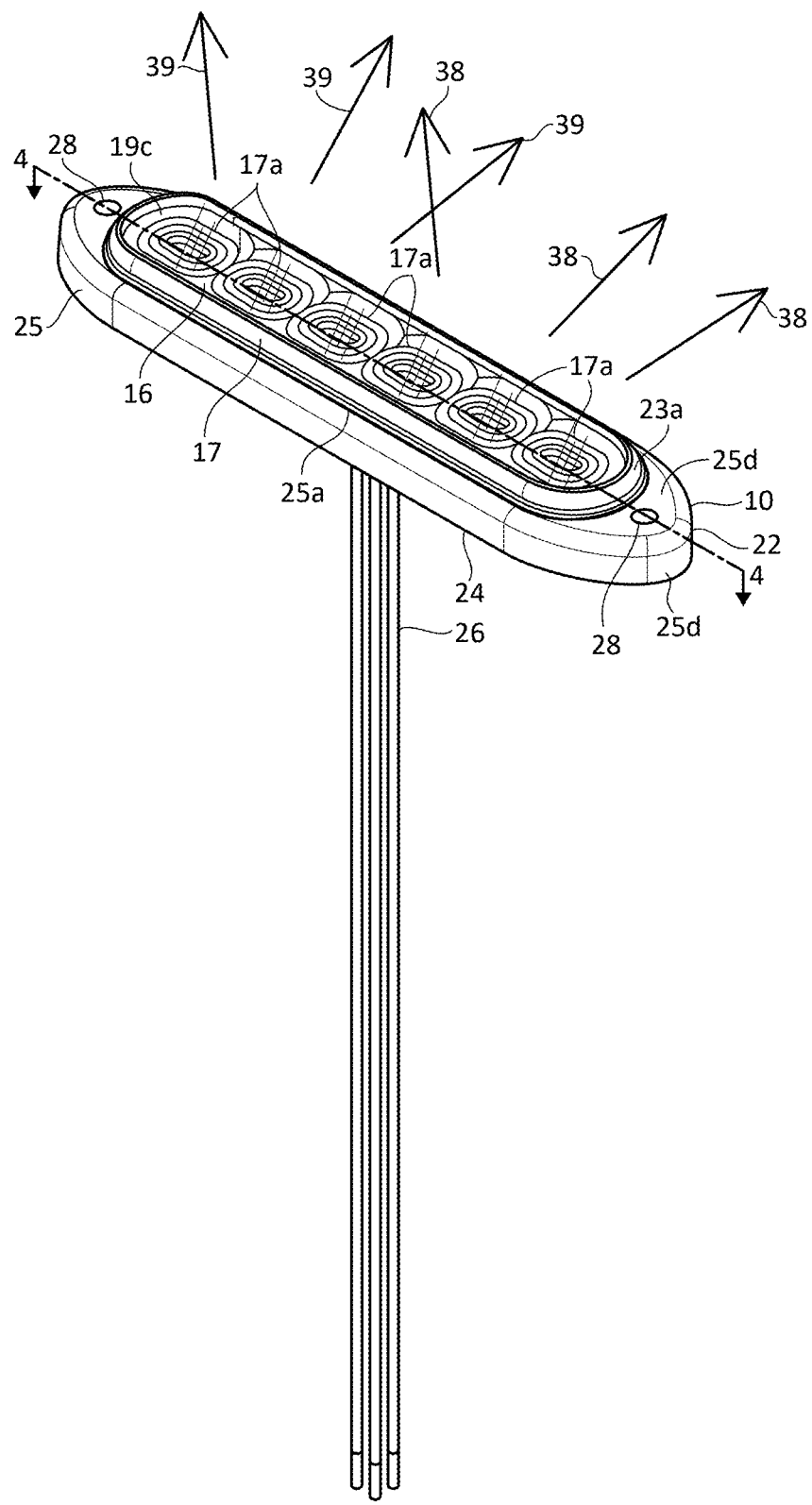
Figure 4:
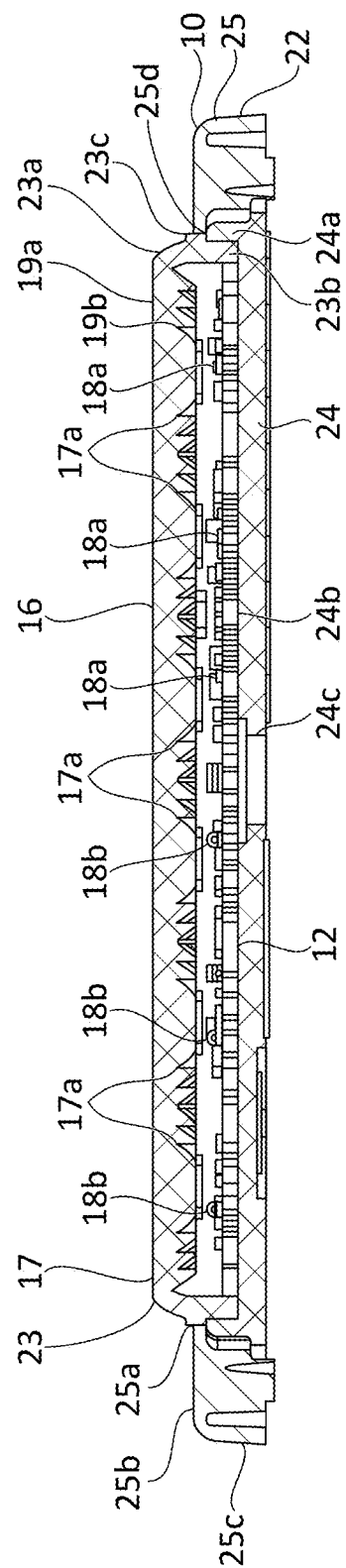
FIG. 4 is a cross-sectional view of the warning light of FIG. 3 along dashed line 4-4 in the direction of arrows at the end of the line.

Referring to FIGS. 2, 3, and 4, a warning light 10 of the present invention is shown having a circuit board 12 upon which is mounted light sources of LEDs 18a for emitting light which is violet in color along a peak wavelength within a range of wavelength, and LEDs 18b for emitting light which is non-violet in color along the visible illumination spectrum, such as amber, red, blue, and/or white, or any color other than violet. Preferably, all of LEDs 18b emit light of the same non-violet color, and the range of violet wavelengths emitted from LEDs 18a extends from the UV range to just above the UV range into the visible spectrum of light, where light starts being visible about 390 nm to 400 nm to the unaided human eye depending on the particular human observer. The circuit board 12 further has a controller 14 for controlling operation of LEDs 18a and 18b either to activate all LEDs 18a and 18b at the same time, or each group of LEDs 18a and 18b separately, as will be described in more detail in discussion of the electronics for enabling operation of the warning light or device in connection with FIGS. 9, 10, and 11. Three LEDs 18a and three LEDs 18b are provided along circuit board 12, however, a single or other number of LEDs 18a, and a single or other number of LEDs 18b may be used. While a single circuit board 12 is shown, the electronics may be provided upon multiple circuit boards.

Light from each of the LEDs 18a and 18b when activated passes through a lens 16 which projects the light received outward from the warning light. Lens 16 has a body 17 with refractive structures 17a representing Fresnel lenses, one for each of the LEDs 18a and 18b to shape (refract and/or diffuse) light when emitted therefrom outward from warning light 10. Lens 16 has a flat front surface 19a, and back surface 19b shaped to provide refractive structures 17a. Optionally, where light shaping is not desired, lens 16 may be provided without refractive structures 17a (being non-refractive and/or non-diffusing to LEDs 18a and 18b light), and back surface 19b is instead flat. The body 17 of lens 16 is composed of optically transparent material, clear in color, of UV absorbing material(s) to substantially block UV light, such as polycarbonate. Light from LEDs 18a when passing through lens 16 causes a shift in their peak wavelength and range of emitted violet light to provide violet light dominantly, or more dominantly (i.e., more light energy) at higher wavelengths in the visible light spectrum than emitted from LEDs 18a. The material of lens 16 removes shorter wavelengths of violet light, principally below 390 nm, that may be emitted from LEDs 18a, effectively removing most if not all UV light considered invisible to human eyes, i.e., UV light considered the most harmful to humans.

Figure 5:
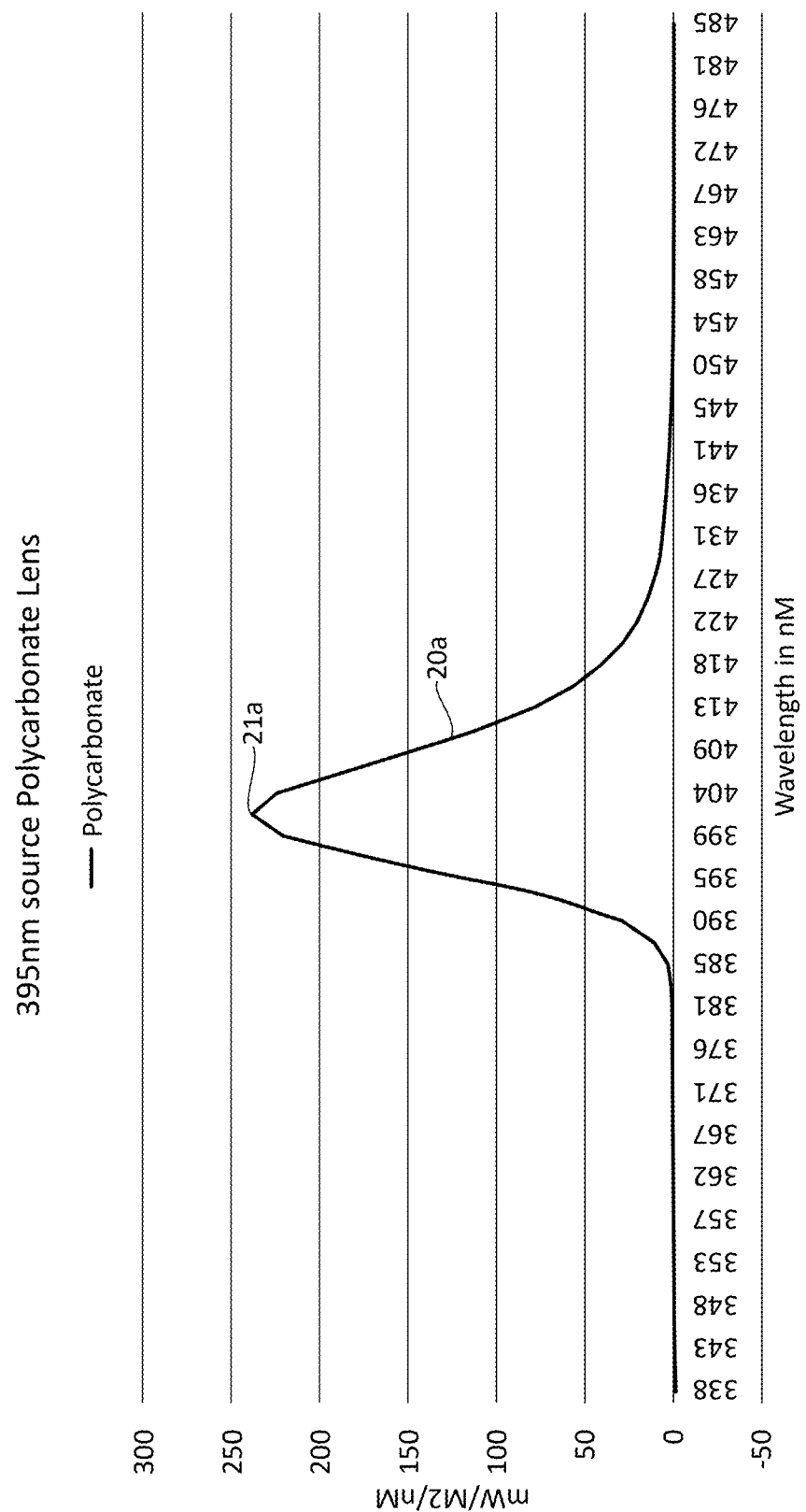
FIG. 5 is a graph illustrating light output energy versus wavelength of the warning light of FIGS. 2 and 3 when projecting fluorescence inducing signals from light source(s) emitting violet light at a dominate wavelength of 395 nm±5 nm.
Figure 6:
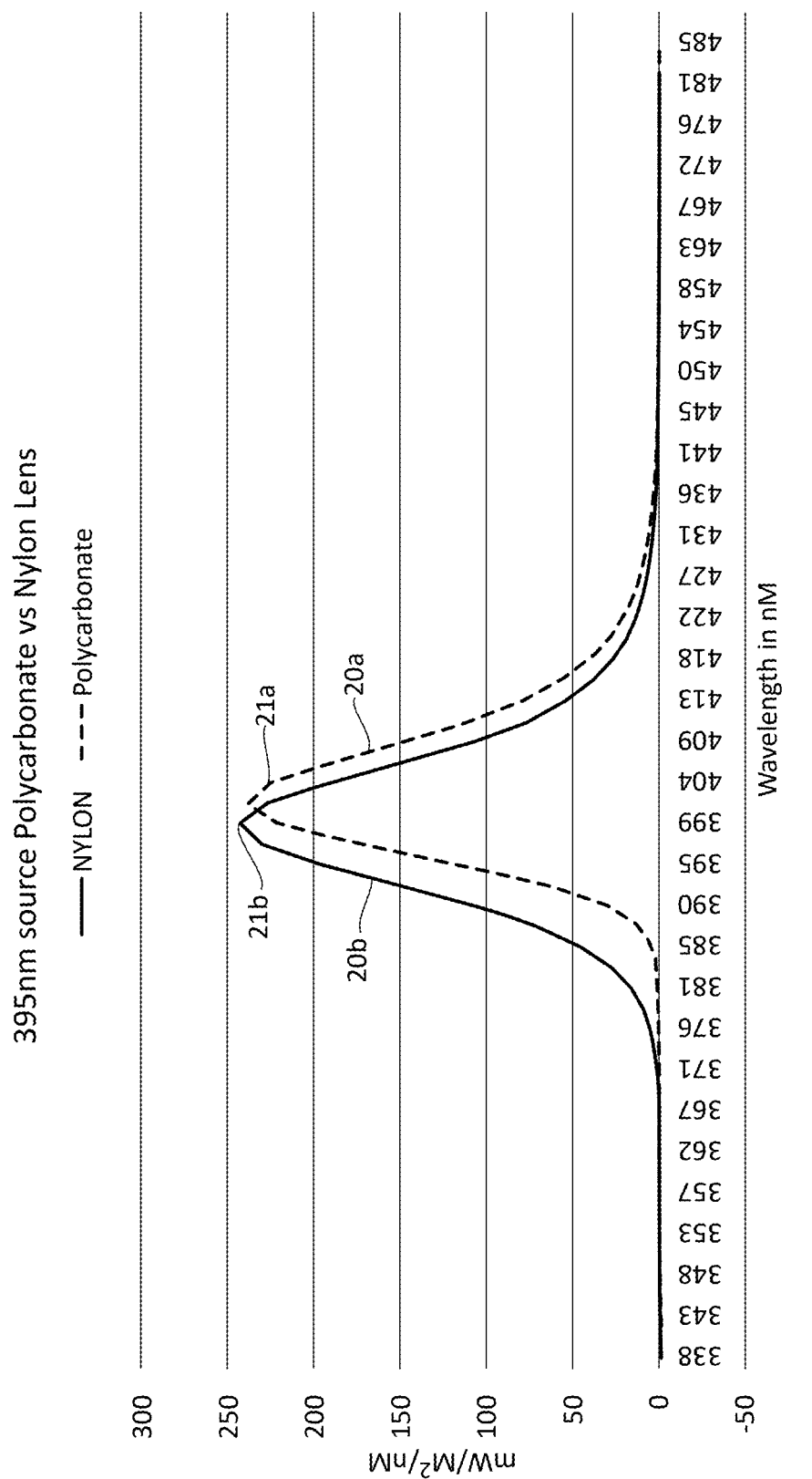
FIG. 6 is graph illustrating light output energy versus wavelength of the warning light of FIGS. 2 and 3 when projecting fluorescence inducing signals from light sources emitting violet light at a dominate wavelength of 395 nm±5 nm using lenses of different materials, where the dashed line along the graph illustrates warning light performance of the warning light's preferred lens composed of polycarbonate material, and solid graphed line illustrate undesirably performance of a non-preferred lens of nylon material.

An example of violet light emitted from warning light 10 via lens 16 when LEDs 18a are activated is plotted as line 20a in the graph of FIG. 5 in the case where LEDs 18a are each a LUMILEDS® LED, Model No. LHUV-0395-A065, designed to output peak light at 395 nm±5 nm. As shown in FIG. 5, the range of violet wavelengths extends from 386 nm to 435 nm (for at least 95% of light energy) with a peak wavelength 21a of 401 nm (highest light energy output) per spectrophotometer measurements. A comparison of the effect of lens 16 on violet light of LEDs 18a is shown in FIG. 6 with and without the preferred lens 16. In FIG. 6, line 20a of FIG. 5 is denoted as a dashed line, and a line 20b is plotted showing light output, per spectrophotometer measurements, from another one of lens 16 when composed of a different, less preferred material, of nylon which is non-absorbing or minimally absorbing to UV light. Thus, line 20b closely resembles the light output of LEDs 18a, which indicates a range of wavelengths of violet color extending from 370 nm to 435 nm with a peak 21b wavelength of about 395 nm (i.e., measured 398 nm in FIG. 6). In this example, within the range of wavelengths of violet light outputted from the polycarbonate composed lens 16 is measured a peak wavelength of 401 nm, further within the visible spectrum than the peak wavelength, 395 nm, by manufactured design (or as measured) of LEDs 18a within the range of wavelengths emitted therefrom.

The light emitted by LEDs 18b also has a peak wavelength along a range of a desired non-violet color depending on the particular application of the warning light, such as amber having a peak wavelength of 620 nm, red having a peak wavelength of 680 nm, or white having a wide spectral output in the range of 400-700 nm over multiple visible colors of one of more peak wavelengths from violet to red that appear white. Unlike violet light from LEDs 18a, there is little or no shift in peak wavelength of light from LEDs 18b exiting warning light 10 in response to passing through the UV absorbing material(s) of lens 16. Thus, lens 16 shifts the dominant or peak wavelength of the violet light from LEDs 18a, but is predominantly non-shifting in wavelength of the non-violet light from LEDs 18b.

The particular shift at the lower end range of violet wavelengths of LEDs 18a emitted light depends on the particular LEDs 18a utilized and UV absorption by lens 16 desired, such that lens 16 shifts the peak wavelength of violet light emitted into, or preferably further into, the visible spectrum of violet light, such as indicated in the example of FIG. 6 of peak 21b shift to peak 21a with a reduction of light energy at shorter wavelengths, especially below 390 nm, which includes invisible UV light. Thus, FIG. 6 illustrates that violet light from LEDs 18a in response to passing through lens 16 shifts in peak wavelength and range of light to provide violet light dominantly, or more dominantly (i.e., more light energy) at higher wavelengths in the visible light spectrum, i.e., above 390 nm, than emitted from LEDs 18a. This shift results in the violet light being more visibly violet to human eyes, especially in low or zero ambient light environments. Other LEDs 18a providing violet light than those designed for peak operation at 395 nm may be used which emit light extend from the UV range to just above the UV range into the visible spectrum of light.

Figure 7:
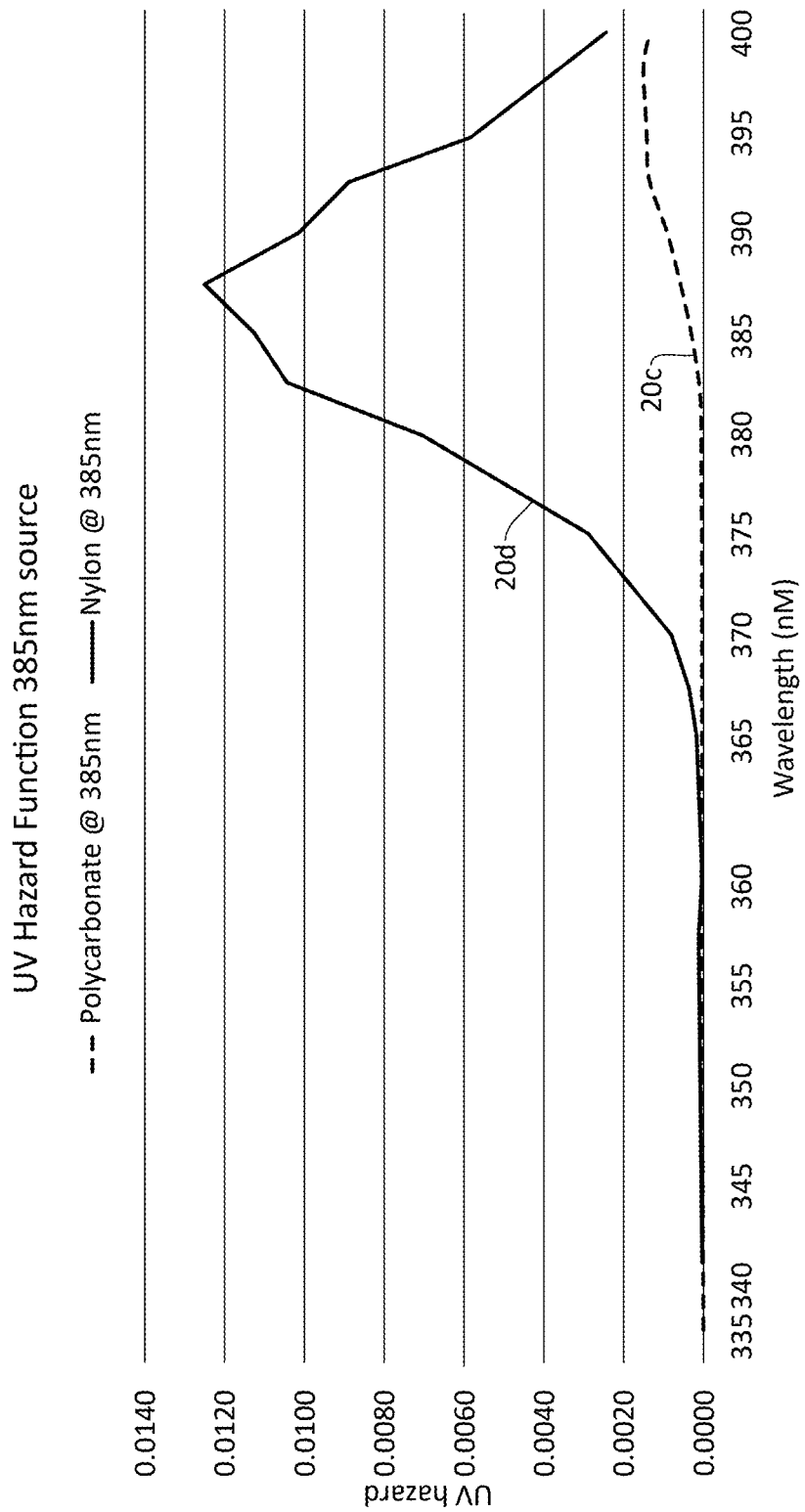
FIG. 7 is a graph of UV hazard function, i.e., effective power of the UV radiation related to its luminous flux, at 385 nm wavelength, per IEC Standard 62471, for two different materials of polycarbonate (dashed line) and nylon (solid line) to show the benefit of improved safety provided by fluorescence inducing signals from the warning light of FIGS. 2 and 3 using a lens composed of polycarbonate material.

In a further illustration, when LEDs 18a are each provided by an LED operating with a peak wavelength of 385 nm, FIG. 7 shows the UV hazard function over wavelength using lens 16 of polycarbonate material, denoted by dashed line 20c, and when instead using another one of lens 16 of nylon material, denoted by solid line 20d. This shows the safety benefit to users of the warning light 10 having the preferred lens 16 of polycarbonate material by greatly reducing the potential risk of damaging effect to humans along UV light range by comparing to the case when lens 16 is replaced with of less preferred nylon material which filters UV closer to when no lens 16 is present in warning light 10.

It has been found that fluorescence photoluminescent materials, i.e., those containing phosphors, will persist in violet wavelengths above 400 nm, outside the UV range of light. Accordingly, use of invisible UV light is unnecessary in warning light 10 of the present invention, and any such stray UV light outputted by the warning light, via the preferred lens 16 of polycarbonate material, is deminimis to its operation by being of little significance to light energy output. In other words, monochromatic light sources, such as typical LEDs, are defined by a dominant wavelength which is where the peak energy lies on an illumination energy output versus wavelength spectral range. Thus, while this spectral range may be wide, outside of the design dominate wavelength of illumination energy output there is a point at which the energy output is no longer significant to performance, as is the case here with respect to any stray UV illumination outputted from the warning light 10 when LEDs 18a are activated. In this manner, warning light 10 of the present invention is considered safer to humans than lighting systems that at least substantially rely on output of invisible UV light for their proper operation to cause fluorescence, such as in earlier described U.S. Pat. No. 11,457, 517 and U.S. Published Patent Application No. 2023/0194066.

Warning light 10 represents a device or apparatus having a housing 22 into which circuit board 12 is received and lens 16 is situated to receive light from LEDs 18a and 18b. To support lens 16 in housing 22, the body 17 extends to provide a fixture 23 along the periphery of an area 19c of lens 16 providing front surface 19a and back surface 19b. Fixture 23 provides a beveled front 23a which extends to a continuous wall 23b having an outward ridge 23c. Housing 22 has a base or tray housing portion 24, and a front housing portion 25 with an opening 25a along a wall 25b of a shape and size for receiving body 17 of lens 16 in which wall 25b extends outward to side wall 25c sized to extend over base housing portion 24. When body 17 of lens 16 is received in opening 25a, its ridge 23c is disposed along edge 25d of opening 25a, body 17 is then mounted to front housing portion 25, such as with adhesive or glue, to retain the body 17 to front housing portion 25 and thereby body 17 becomes an integral part of front housing portion 25 of housing 22. Base housing portion 24 has an outer wall 24a about the periphery of its interior surface 24b supporting circuit board 12.

The assembly of housing 22 is best shown in FIG. 4. Circuit board 12 is received along interior surface 24b of base housing portion 24 such that wires 26 coupled to the circuit board 12 can extend via an opening 24c through base housing portion 24. Then, front housing portion 25 is positioned along base housing portion 24 so that the exterior surface of wall 23b of front housing portion 25 is disposed along to the interior surface of wall 24a of the base housing portion 24 until the bottom of wall 23b lies upon interior surface 24b outside of, or upon the periphery of, circuit board 12, and the edge 25d and ridge 23c, integrated along front housing portion 25, is disposed upon the top of wall 24a of base housing portion 24, with wall 25b and side wall 25c of the front housing portion 25 extended over the base housing portion 24. To retain the base housing portion 24 and front housing portion 25 together, screws 27 extend through holes 28 and 29 in front and base housing portions 25 and 24, respectively, as shown in FIG. 2. For purposes of illustration, screws 27 are not shown in FIGS. 2 and 3, and wires 26, screws 27, and holes 28 and 29 are not shown in FIG. 4. Where refractive structures 17a are present along lens 16, each of the LEDs 18a and 18b are disposed centered under a different one of refractive structures 17a when housing 22 is assembled, so each of LEDs 18a and 18b will provide light principally to their associated refractive structure 17a, but such light will also partially extend to other structures or parts along area 19c of lens 16. Where refractive structures 17a are not present along lens 16, lens 16 provide an optically clear cover along front housing portion 25 for housing 22. Other housings than shown in the FIGS. 2, 3, and 4 may be used in order to dispose circuit board 12 with respect to lens 16 so the light from LEDs 18a and 18b can be outputted via lens 16 from warning light 10.

Figure 8:
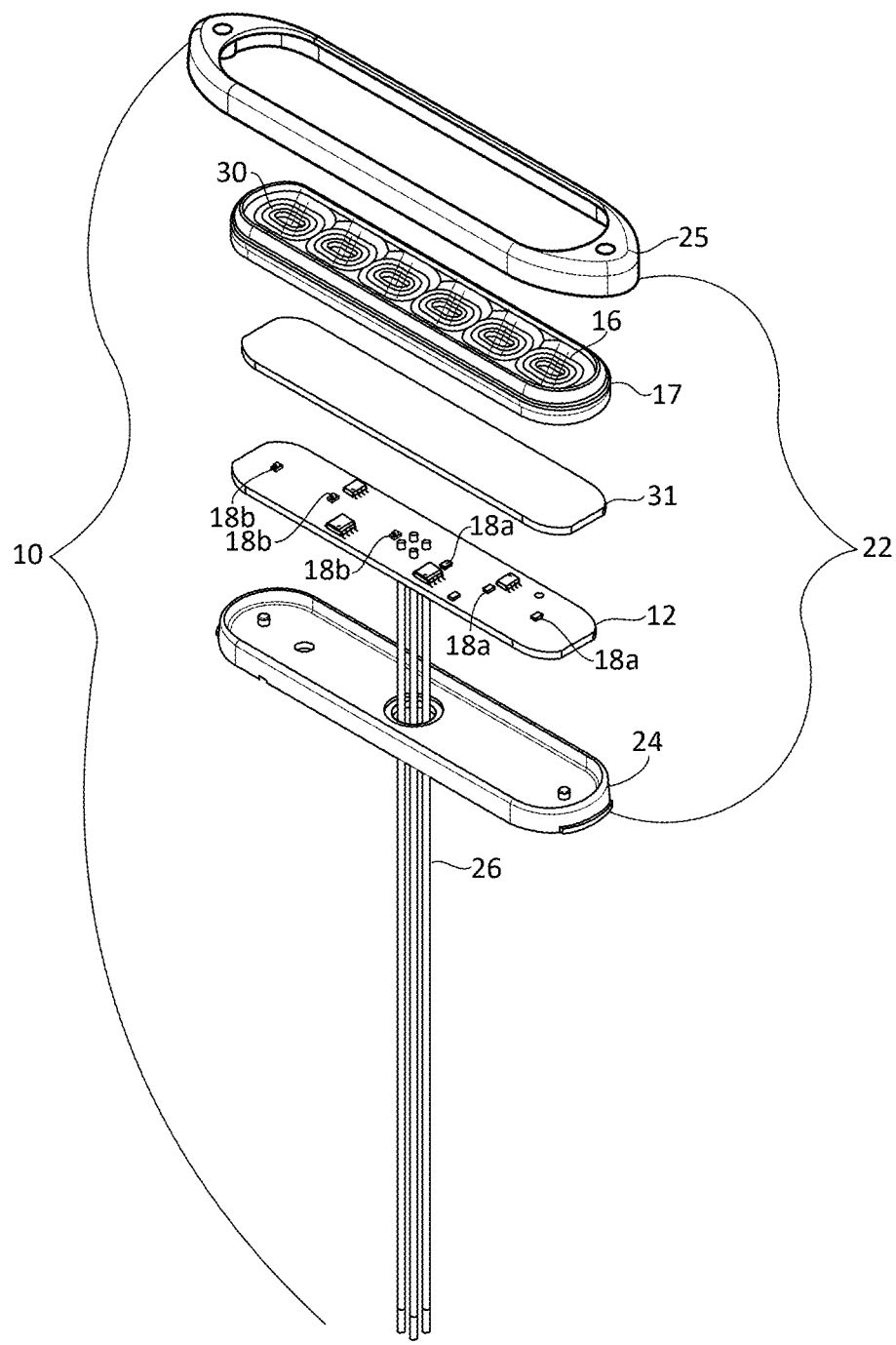
FIG. 8 is the same view of FIG. 2 showing the warning light having a lens and an optional UV filter and optional UV blocking coating along the lens.
Figure 8A:
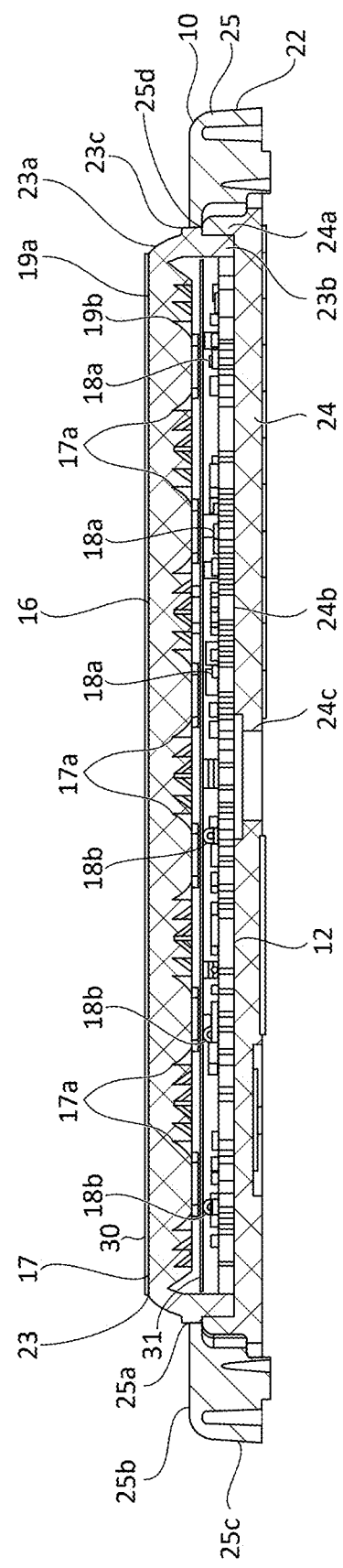
FIG. 8A is the same cross-sectional view as FIG. 4 showing the optional UV filter and optional UV blocking coating of FIG. 8.

Alternatively to the lens 16 being composed of UV absorbing material(s) reducing risk of harmful UV radiation being emitted from warning light 10, lens 16 may be made of material, such as nylon, that does not does provide desired UV absorption, and instead: (i) a coating or layer(s) 30 of UV absorbing material(s) are provided along the lens surface 19a (and/or lens surface 19b), and/or (ii) a UV filter 31 in the form of a sheet or plate of UV filtering material(s) is provided as shown in FIGS. 8 and 8A. Filter 31 is disposed between the lens 16 and circuit board 12 and may be supported in position in housing 22 so that light from LEDs 18a and 18b pass through the filter 31 prior to reaching lens 16, in order to shift the wavelength range and peak wavelength of violet light from LEDs 18a in the same or similar manner as lens 16 described above when made of polycarbonate material, and predominately non-shifting in wavelength of light from non-violet light from LEDs 18b. For purposes of illustration, filter 31 is shown in FIG. 8 as a plate, and in FIG. 8A as a sheet. Optionally, coating 30 and/or filter 31 may be used in addition to lens 16 being composed of UV absorbing material(s), such as polycarbonate, to provide additional UV light filtering or blocking so that the desired range of violet wavelengths and peak wavelength therein is obtained from warning light 10 via lens 16, and coating 30 and/or filter 31. Thus, UV light filtering or blocking materials of lens 16, coating 30, and/or filter 31 can operate alone, or together, to reduce the risk of harmful UV radiation which may be emitted from warning light 10 when LEDs 18a are activated. Thicknesses of coating 30 and filter 31 may not be shown to scale in FIGS. 8 and 8A.

Body 17 providing lens 16 may be made of injection molded plastic, such as of preferred polycarbonate material. Base housing portion 24 and front housing portion 25 of housing 22 may be made of material, such as aluminum or plastic, to dissipate heat from the LEDs 18a and 18b through the base housing portion 24 into the ambient environment, and/or through the structure upon which the back exterior surface of base housing portion 24 is mounted, where such structure may be the exterior surface of a vehicle.

Figure 9:
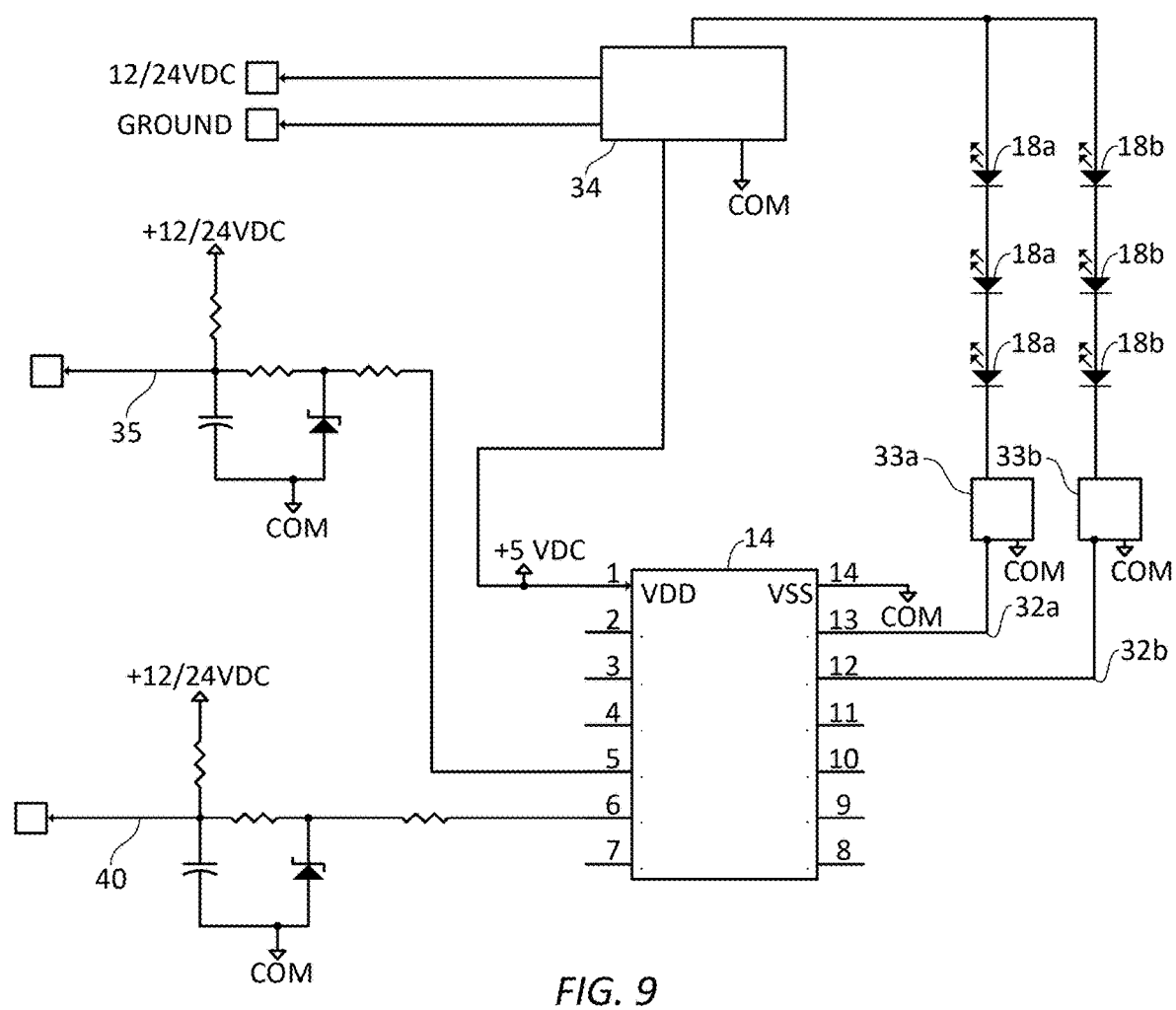
FIG. 9 is a schematic diagram of the electronics of the warning light of FIGS. 2 and 3.

Referring to FIG. 9, a schematic of the electronics of warning light 10 is shown on circuit board 12. The controller 14 output signals along two enable lines 32a and 32b to individually control current sources 33a and 33b respectively, of two circuits for driving LEDs 18a and 18b, respectively. Each enable line 32a and 32b when high (ON) switches on drive current to their associated LEDs 18a and 18b, respectively, and when low (OFF) disables drive current to their associated LEDs. The current sources 33a and 33b may each be provided by a MOSFET operating responsive to the respective enable lines 32a and 32b. The controller 14 operates in accordance with a program stored in its memory (ROM or RAM) to enable operation of warning light 10. For example, controller 14 may be a PIC microcontroller, but other microcontroller, microprocessor, or programmable logic device may be used which can output enable signals to each of the circuits associated with LEDs 18a and 18b.

Each group of LEDs 18a and 18b provide light of a different color as described earlier. LEDs 18a when activated emit violet light enabling fluorescence inducing signals dominantly in the visible spectrum, indicated by light rays 38 in FIG. 3, to be projected from warning light 10 via lens 16, and other optics of coating 30 and/or filter 31 if present, which will cause fluorescence in photoluminescent materials illuminated by such signals. When LEDs 18b are activated, visible warning signals, indicated by light rays 39 in FIG. 3, are provided from the warning light 10 via lens 16, and other optics of coating 30 and/or filter 31 if present, such as of red, blue, amber or white, depending on the desired color of LEDs 18b.

An adjustable voltage source 34 is provided representing a voltage converter to supply power to operate controller 14 and the individual circuits driving LEDs 18a and 18b (in accordance with the manufacturer specifications of the LEDs) when enabled. A ground line and 12/24 VDC line are provided to adjustable voltage source 34 so that components, such as controller 14 and LEDs 18a and 18b circuits will have proper operating voltage. Voltage source 34 may externally receive 12 VDC or 24 VDC depending on the voltage source externally available.

The pattern of operating LED 18a and 18b by controller 14 can be selected by a pattern select input 40. By placing on input 40 signals representative of a one of different values, addresses, codes, or instructions, detectable by the controller 14, one of multiple different patterns of illumination by LEDs 18a and 18b and hence output light from warning light 10 may be selected to provide fluorescence inducing signals 38 and/or warning signals 39, respectively, such as solid on, or flashing at different rates or patterns by controlling enable lines 32a and 32b. If no signal is provided along pattern select input 40, then a default pattern is used by controller 14 as set forth in memory of the controller. The present invention is not limited to any particular means for pattern input selection to controller 14. The flashing rate is in accordance with a preset on and off intervals stored in memory of the controller 14. A clock in the controller 14 is used to measure each of the flash intervals.

An optional synchronization line 35 may also be provided to controller 14. When synchronization line 35 is switched from high to low, controller 14 resets the cycle of its internal clock. Such is useful when warning light 10 is provided in different housings 22a and 22b, as will be described later in connection with FIGS. 13A and 13B, need to be synchronized to each other so that they flash at the same time, or alternate with each other in providing two or three state operation as described below. Synchronization line 35 is also useful to sync operation of multiples ones of warning light 10 when mounted along the same vehicle, or to sync operation with other types of warning lights, light bars, or beacons which may be present along the same vehicle. Wires 26 exiting through opening 24c of base housing portion 24 include ground line, 12/24 VDC line, pattern select input 40, and optionally synchronization line 35 if desired. While components described herein are shown mounted to circuit board 12 of FIG. 2, wires to and between components, and other components of FIG. 9 are not shown on FIG. 2 for purposes of illustration.

In operation, fluorescence inducing signals 38 are ideally outputted by the warning light 10 when other visible light sources in the area are at a minimum to cause the maximum fluorescence effect in photoluminescent materials. Thus, fluorescence inducing signals 38 may be synchronized with visible warning signals 39 (and if present other lights at the scene, such as amber flashing lights along a vehicle), so that the violet LEDs 18a are active when LEDs 18b enabling flashing visible warning signals 39 are off, and vice versa, maximizes visibility at a work site utilizing warning light 10. This is referred to below as a two state operation mode. It has been found that the human brain responds to change, thus while alternating states between violet light of fluorescence inducing signals 38 and visible warning signals 39, like amber, is useful, adding another state where both fluorescence inducing signals 38 and visible warning signals 39 are simultaneous outputted, by activating both LEDs 18a and 18b at the same time, increases visual stimuli to the brain and thus the alertness of the persons in the vicinity of the warning light 10. This is referred to below as a three state operation mode. These two different modes of operation are selectable via pattern select input 40 are shown by timing diagrams of FIGS. 10 and 11. Optionally, one of the modes may be a fixed setting in controller 14 memory, which in such case pattern select input 40 is optional.

Figure 10:
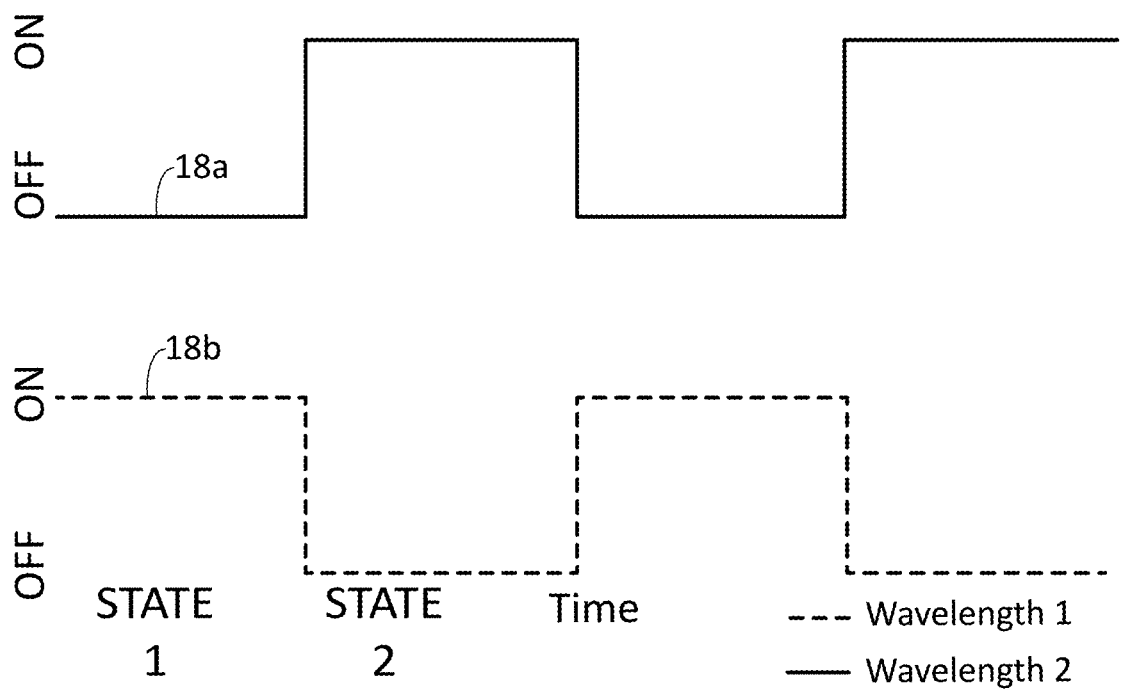
FIG. 10 is a timing diagram illustrating two state operation of the warning light of FIGS. 2 and 3, where violet and non-violet light sources are alternately activated to provide alternating non-violet visual warning signals and violet fluorescence inducing signals from the warning light.

FIG. 10 shows a first mode for two state operation, in which controller 14 enables LEDs 18a and 18b by turning their associated enable lines 32a and 32b alternatively high and low to provide an alternating two state operation, where in a first state LEDs 18b providing visual warning signals 39 from warning light 10 are ON (enabled) and LEDs 18a providing fluorescence inducing signals 38 from warning light 10 are OFF (not enabled) and a second state LEDs 18a providing fluorescence inducing signals 38 from warning light 10 are ON (enabled) and LEDs 18b providing visual warning signals 39 from warning light 10 are OFF (not enabled). The controller 14 operates the light sources 18a and 18b to periodically repeat the two state operation sequence. The time intervals between successive states may be 0.5 seconds, but other time intervals may be used as stored in memory of controller 14 for selection by pattern select line 40.

Figure 11:
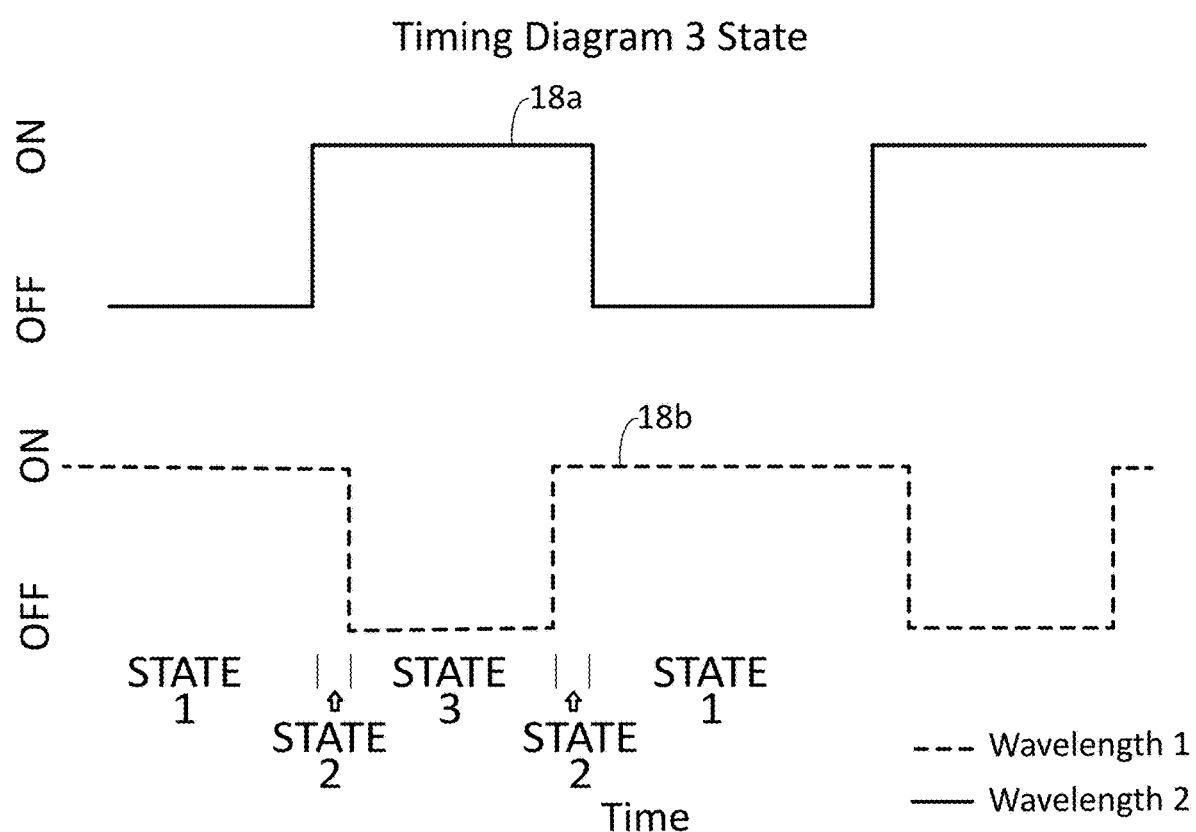
FIG. 11 is a timing diagram illustration three state operation of the warning light of FIGS. 2 and 3, where in addition to the two states shown in FIG. 10 a third state is added where violet and non-violet light sources are activated simultaneously to provide both non-violet visual warning signals and violet fluorescence inducing signals.

FIG. 11 shows a second mode of the three state operation, where in a first state LEDs 18b providing visual warning signals 39 from warning light 10 are ON (enabled) and LEDs 18a providing fluorescence inducing signals 38 from warning light 10 are OFF (not enabled), a second state where all LEDs 18a and 18b providing both visual warning signals 39 and fluorescence inducing signals 38 are ON (enabled), and a third state LEDs 18a providing fluorescence inducing signals 38 from warning light 10 are ON (enabled) and LEDs 18b providing visual warning signals 39 from warning light 10 are OFF (not enabled). The three states may repeat in numerical ascending and then descending order sequence, i.e., first state, second state, third state, second state, first state, and so on. In the preferred three state operation of FIG. 11, prior to transitioning between first and third states or between third and first states, the non-enabled LEDs 18a or 18b are turned ON to achieve the second state where both LEDs 18a and 18b are ON. As shown, the duration of the second state is preferably shorter than the duration of each of the first and third states, but other durations of first, second, and third states may be used, and other sequencing of first, second, and third states than shown may be used as desired. Time intervals desired for durations of each state are stored in memory of controller 14, and may be selectable by pattern select line 40. The controller 14 operates the light sources 18a and 18b to periodically repeat the three state operation sequence. The controller 14 starts operating in the desired mode in accordance with selected pattern input 40, and synchronization (if any) upon applied power to the controller 14, i.e., when external 12/24 VDC is provided via one of wires 26.

Figure 12:
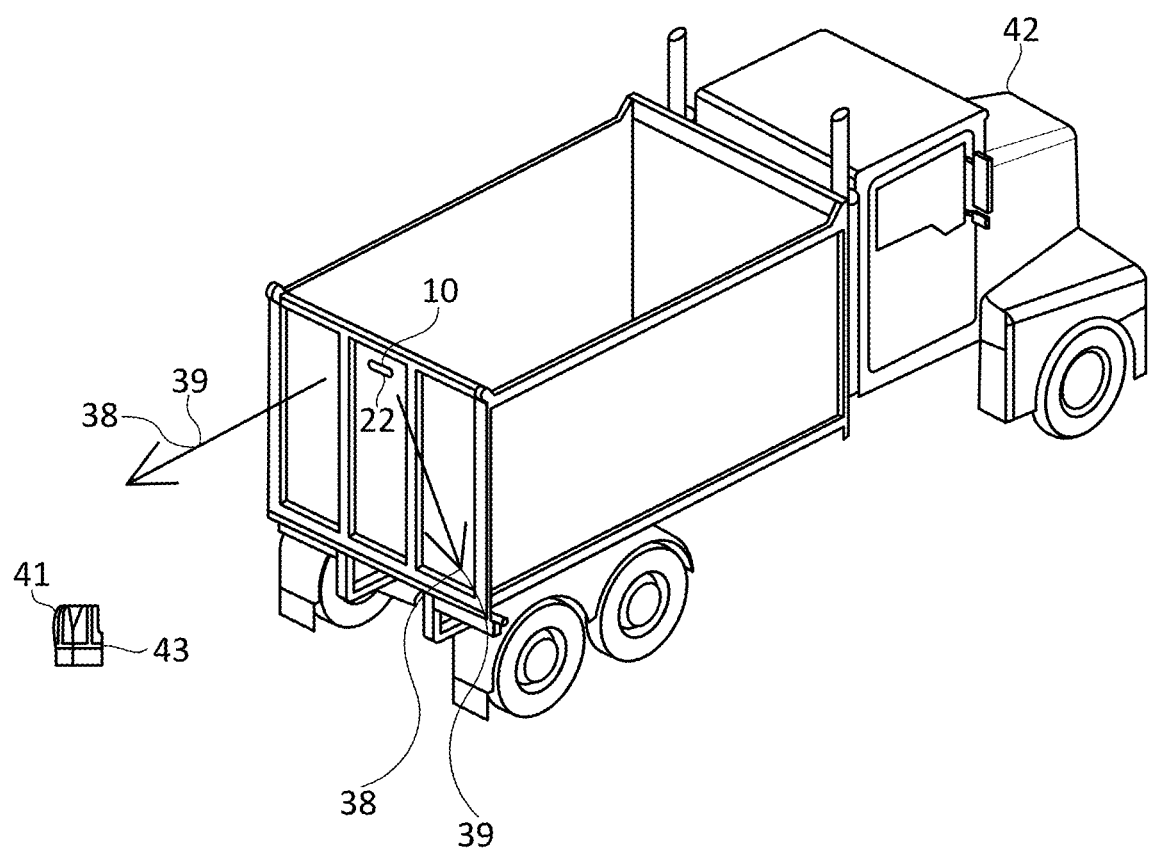
FIG. 12 shows an example of a vehicle upon which is mounted the housing of the warning light of FIGS. 2 and 3.

The warning light 10 is mountable along the exterior of the body of a vehicle 42, such as for example a construction truck shown in FIG. 12 that may be present at a work site along a roadway. During installation, the housing 22 of warning light 10 is aligned over an opening along exterior body of vehicle 42 for extension and connection of wires 26 in a manner typical of other visual warning devices along vehicles to enable operation and control of warning light 10. Screws 27 in additional to retaining the warning light's housing 22 closed may further be used to mount the warning light 10 through holes along the exterior body of the vehicle 42 using fasteners. Other mechanisms for mounting the housing may be performed, such as using a tray or bracket, as typical of mounting warning lights upon vehicles.

In operation, fluorescence inducing signals 38 of dominantly visible violet light when outputted from warning light 10 causes objects or surfaces, such as safety vest 41 (FIG. 12) having photoluminescent materials, such as phosphors, to fluoresce in order to enhance their visibility in low or zero ambient (natural and/or artificial) light environments. Other features may be provided along safety vest 41, such as reflective strips 43. Any worn or held objects or clothing with phosphors may similarly fluoresce in response to illumination by fluorescence inducing signals 38. Other objects or surfaces benefiting from enhanced visibility may include reflective signs, markings, or paint used along the vehicle or roadway which may also include photoluminescent materials. Visible warning signals 39 when outputted do not cause such fluorescence effect and illuminate more generally the scene at the work site.

Figure 13A:
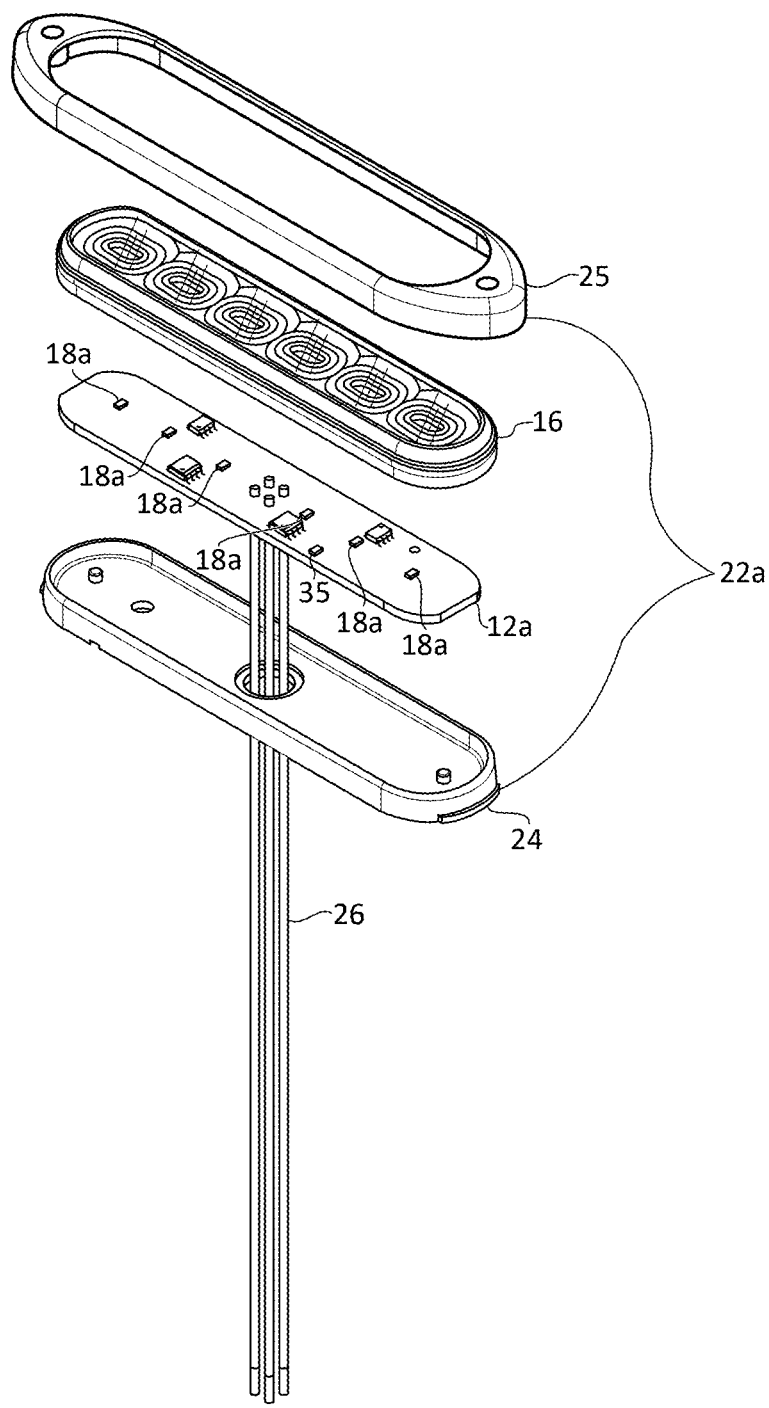
FIGS. 13A and 13B illustrate an embodiment of the warning light of the present invention when operated in two separate housings, rather than a single housing embodiment of FIGS. 2-4, where
Figure 13B:
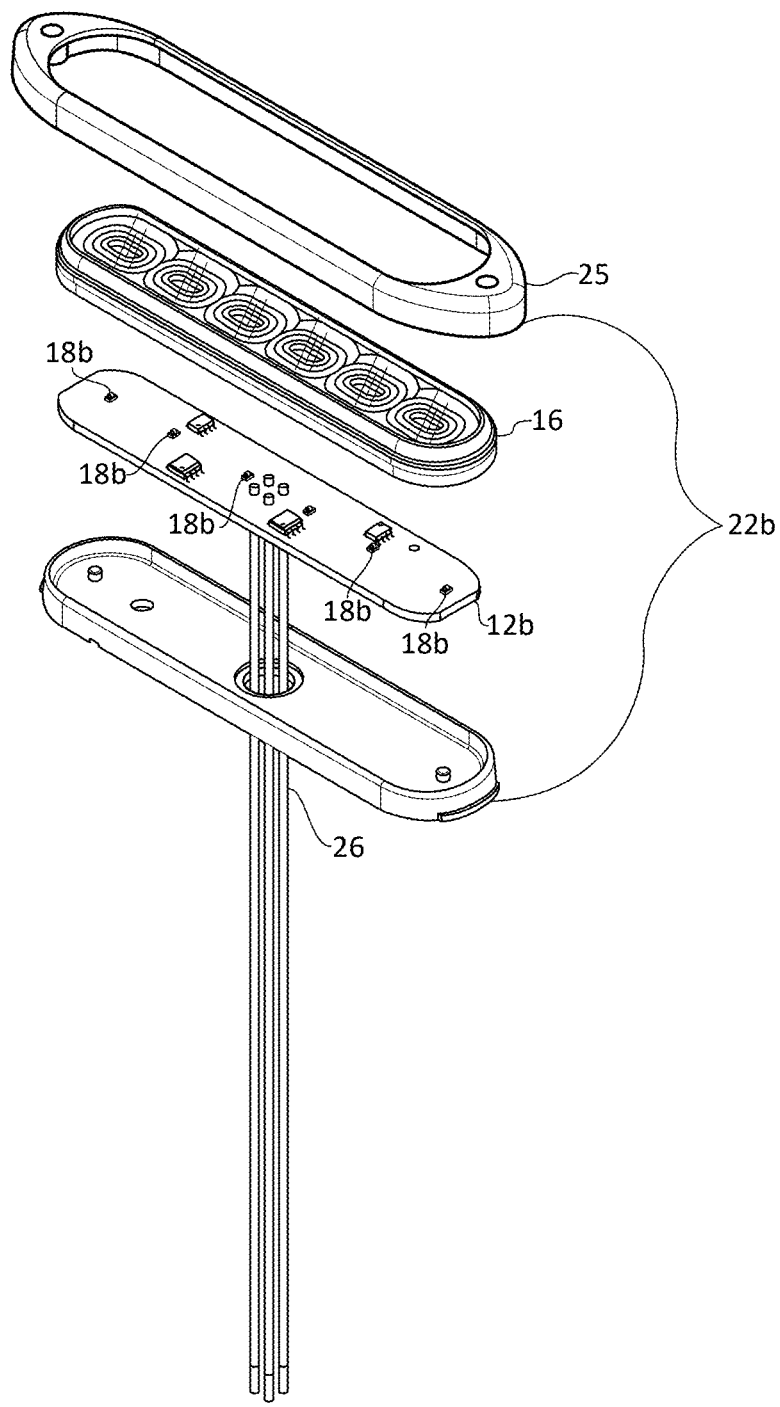
Figure 14:
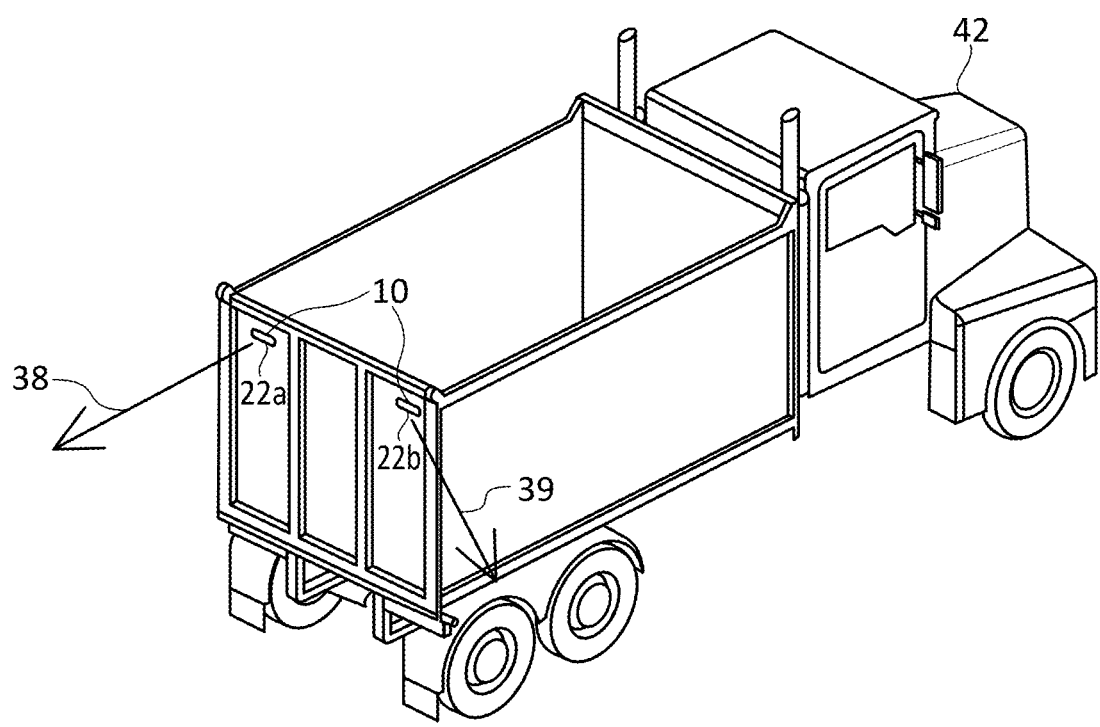
FIG. 14 shows an example of a vehicle upon which is mounted the housings of FIGS. 13A and 13B.

While warning light 10 is shown in a single housing 22, optionally the warning light 10 may be contained in two separate housing 22a and 22b each with different one of LEDs 18a and LED 18b as shown in FIGS. 13A and 13B. The housing 22a and 22b are the same as housing 22 described earlier, and circuit boards 12a and 12b are the same as circuit board 12, except each has only mounted LEDs 18a and 18b, respectively. Six LEDs 18a are shown on circuit board 12a, and six LEDs 18b are shown on circuit board 12b, but one or more number of LEDs may be used of the same color on each circuit board. The electronics of FIG. 9 is also the same on each of the circuit boards 12a and 12b, except where all the LEDs are of the same one of LEDs 18a or 18b, respectively, and enabled ON and OFF together by the controller present in respective housing 22a and 22b. Optionally, all the LEDs on each of circuit boards 12a and 12b may be in series with each other using a single circuit, enable line, and current source. While a single circuit boards 12a and 12b are shown, electronics may be provided in their respective dual housings 22a and 22b on multiple circuit boards. FIG. 14 shows an example of the two housings 22a and 22b of warning light 10 mounted onto the exterior body of vehicle 42 in proximity to each other. In operation, LEDs 18a of housing 22a are operated to provide fluorescence inducing signals 38, and LEDs 18b of housing 22b are operated to provide visual warning signals 39 via their respective lens 16. The LEDs 18a and 18b of respective housing 22a and 22b operate solid on, or flashing, and preferably in the same manner as if present in a single housing 22, such as in one of the desired operational modes shown in FIGS. 10 and 11. For example, this may be achieved using the synchronization line to or between the controllers on respective circuit boards 12*a* and 12*b* to start flash sequence in a desired pattern and rate, where the desired mode is either fixed in each controller's memory or selected by use of pattern select input to each controller.

One advantage in addition to the beneficial filtering of UV light of lens 16 of polycarbonate material when LEDs 18*a* are activated using visible violet light over UV is the manufacturability of the lens 16, which optically collimates via diffusion and diffraction the light by structures 17*a* if present, and as part of front housing portion 25 enclosing the circuit board 14 in housing 22 upon base housing portion 24. Polycarbonate is used as a housing and optical component in warning light 10 since it has good optical and strong physical properties, it is also relatively inexpensive. While lens 16 of polycarbonate material blocks most UV wavelengths, the specifics of the transmission of light through the lens depends on factors like thickness and additives used in the polycarbonate, but it is believed that light transmission loss start at 400 nm with increasing losses as wavelength goes down further into the UV spectrum at shorter wavelengths.

From the foregoing description, it will be apparent that there has been provided improved warning lights using dominantly visible violet light to induce fluorescence in photoluminescent materials. Variations and modifications in the herein described warning lights within the scope of the invention will undoubtedly suggest themselves to those skilled in the art. Accordingly, the foregoing description should be taken as illustrative and not in a limiting sense.

The invention claimed is:

1. A warning light outputting different colors of light comprising:
    a plurality of light sources for emitting light of different colors, wherein one of said different colors of light emitted is violet having a first peak wavelength along a first range of wavelengths, and one or more other of said different colors is non-violet along a spectrum of visible illumination to human eyes;
    a lens; and
    a controller for activating at least one of said plurality of light sources emitting light of said one or more other of said different colors to provide visible warning signals via at least said lens, and activating at least one of said plurality of light sources emitting light of said one of said different colors, via at least said lens, to provide fluorescence inducing signals for photoluminescent materials having a second peak wavelength along a second range of wavelengths, wherein in response to passing through at least said lens said second range of wavelengths is of higher wavelengths, dominantly along the spectrum of visible violet illumination to human eyes, than said first range of wavelengths, and said second peak wavelength is higher than said first peak wavelength.

2. The warning light of claim 1 wherein said lens shifts the light from said at least one of said plurality of light sources emitting light of said one of said different colors from said first range of wavelengths to said second range of wavelengths, and from said second peak wavelength to said first peak wavelength, by filtering or blocking light energy along a lower portion of the first range of wavelength representing ultraviolet radiation.

3. The warning light of claim 1 wherein said at least one of said plurality of light sources emits light of said one or more other of said different colors when activated has a third peak wavelength which is predominantly non-shifted in wavelength in response to passing through said lens in said visible warning signals.

4. The warning light of claim 1 wherein said fluorescence inducing signals cause any object or surface having said photoluminescent materials receiving said fluorescence inducing signals to fluoresce enhancing visibility of said object or surface in low or zero ambient light environments.

5. The warning light of claim 1 wherein said lens is composed of ultraviolet radiation absorbing material.

6. The warning light of claim 5 wherein said material is polycarbonate.

7. The warning light of claim 5 further comprising an ultraviolet light filter, wherein said ultraviolet radiation absorbing material of said lens and said ultraviolet light filter operate together to provide said fluorescence inducing signals having said second peak wavelength and said second range of wavelengths in response to light from said at least one of said plurality of light sources emitting light of said one of said different colors passing through said lens and said filter.

8. The warning light of claim 5 wherein said lens has an ultraviolet light absorbing coating, and said ultraviolet radiation absorbing material of said lens and said ultraviolet light absorbing coating operate together to provide said fluorescence inducing signals having said second peak wavelength and said second range of wavelengths in response to light from said at least one of said plurality of light sources emitting light of said one of said different colors passing through said lens and said coating.

9. The warning light of claim 1 wherein said lens comprises an ultraviolet light absorbing coating which enables said fluorescence inducing signals having said second peak wavelength and said second range of wavelengths in response to light from said at least one of said plurality of light sources emitting light of said one of said different colors passing there through.

10. The warning light of claim 1 wherein said lens has structures for shaping light from each of said light sources when activated.

11. The warning light of claim 1 wherein said fluorescence inducing signals are of said second wavelength range having 95% light energy from 386 nm to 435 nm.

12. The warning light of claim 1 wherein said first peak wavelength is below 400 nm, and said second peak wavelength of light energy is between 400 nm to 420 nm.

13. The warning light of claim 1 further comprising two housings in proximity to each other in which a first of said housings has one of said lens and at least one of said controller and said at least one of said plurality of light sources emitting light of said one or more other of said different colors to provide said visible warning signals, and a second of said housings has another one of said lens and at least another one of said controller and said at least one of said plurality of light sources emitting light of said one of said different colors, via said another one of said lens, to provide said fluorescence inducing signals.

14. The warning light of claim 1 wherein said controller operates in a mode alternating between a first state for activating those ones of said light sources enabling visible warning signals and a second state for activating those ones of said light sources enabling fluorescence inducing signals.

15. The warning light of claim 1 wherein said controller operates in a mode repeating a first state of activating those ones of said light sources enabling said warning signals and disabling those ones of said light sources enabling said fluorescence inducing signals, a second state of activating all of said light sources enabling both said warning signals and said fluorescence inducing signals, and a third state of activating said ones of said light sources enabling said fluorescence inducing signals and disabling said ones of said light sources enabling said warning signals.

16. A method for outputting different colors of light from a warning device comprising steps of:
providing a plurality of light sources for emitting light of different colors, wherein one of said different colors of light emitted is violet having a first peak wavelength along a first range of wavelengths, and one or more other of said different colors is non-violet along a spectrum of visible illumination to human eyes;
activating at least one of said plurality of light sources emitting light of said one or more other of said different colors to provide visible warning signals via a lens; and
activating at least one of said plurality of light sources emitting light of said one of said different colors, via at least said lens, to provide fluorescence inducing signals for photoluminescent materials having a second peak wavelength along a second range of wavelengths, wherein in response to passing through at least said lens said second range of wavelengths is of higher wavelengths, dominantly along the spectrum of visible violet illumination to human eyes, than said first range of wavelengths, and said second peak wavelength is higher than said first peak wavelength.

17. A warning light comprising:
a housing;
one or more circuit boards in said housing having at least a plurality of light sources for emitting light of different colors, wherein one of said different colors is violet, and one or more other of said different colors is non-violet along a spectrum of visible illumination;
a lens disposed along a front of said housing which shifts a dominant wavelength of the light from at least one of said plurality of light sources emitting light which is violet, and said lens being predominantly non-shifting in wavelength of the light from at least one of said plurality of light sources emitting light which is non-violet; and
a controller along one of said one or more circuit boards for activating said plurality of light sources, in which at least one of said plurality of light sources emitting light which is violet when activated by said controller provides fluorescent inducing illumination which causes any objects or surfaces having phosphors to fluoresce.

18. The warning light of claim 17 wherein said controller operates in a mode alternating between a first state for activating said at least one of said lights sources emitting light of said one or more other said different colors, and a second state for activating said at least one of said lights sources emitting light of said one of said different colors.

19. The warning light of claim 17 wherein said controller operates in a mode repeating a first state of activating said at least one of said light sources emitting light of said one or more other said different colors and disabling said at least one of said light sources emitting light of said one of said different colors, a second state of activating said at least one of said light sources emitting light of said one or more other said different colors and said at least one of said light sources emitting light of said one of said different colors, and a third state of activating said at least one of said light sources emitting light of said one of said different colors and disabling said at least one of said light sources emitting light of said one or more other said different colors.

20. A warning light outputting different colors of light comprising:
a plurality of light sources for emitting light of different colors, wherein one of said different colors of light emitted is violet having a first peak wavelength along a first range of wavelengths, and one or more other of said different colors is non-violet along a spectrum of visible illumination to human eyes;
a lens and a filter disposed between said lens and at least those ones of said light sources emitting violet light; and
a controller for activating at least one of said plurality of light sources emitting light of said one or more other of said different colors to provide visible warning signals via at least said lens, and activating at least one of said plurality of light sources emitting light of said one of said different colors, via said lens and said filter, to provide fluorescence inducing signals for photoluminescent materials having a second peak wavelength along a second range of wavelengths, wherein in response to passing through one or more of said lens and said filter said second range of wavelengths is of higher wavelengths, dominantly along the spectrum of visible violet illumination to human eyes, than said first range of wavelengths, and said second peak wavelength is higher than said first peak wavelength.

21. The warning light of claim 20 wherein one or more of a coating on said lens or material of said lens operates to provide said fluorescence inducing signals having said second peak wavelength and said second range of wavelengths in response to light from said at least one of said plurality of light sources emitting light of said one of said different colors passing there through.

* * * * *